Sept. 4, 1923.
H. E. G. ANDERSON
COW TAIL HOLDER
Filed May 9, 1923
1,467,221
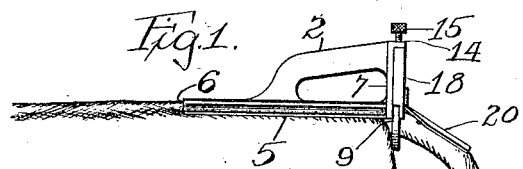
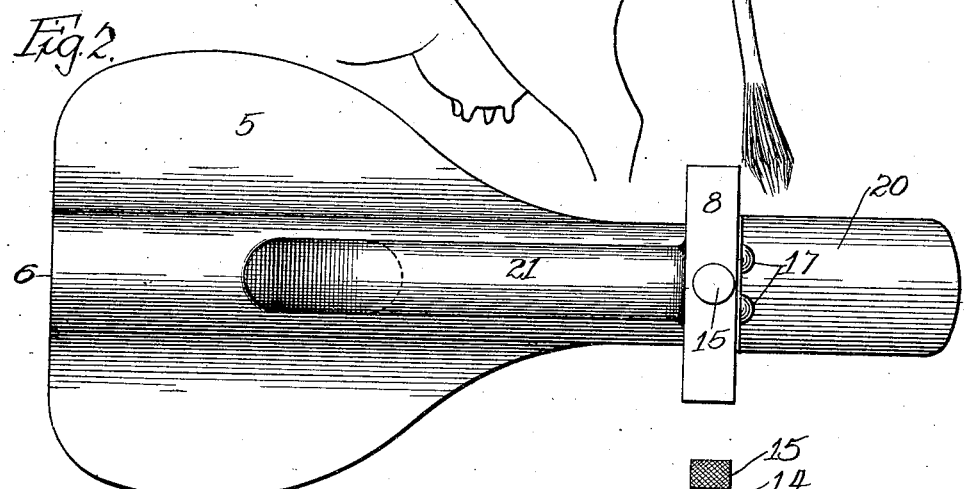
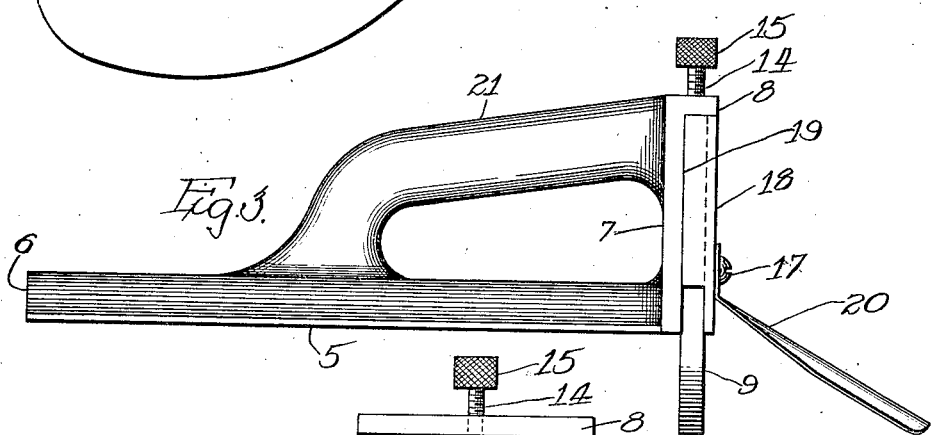
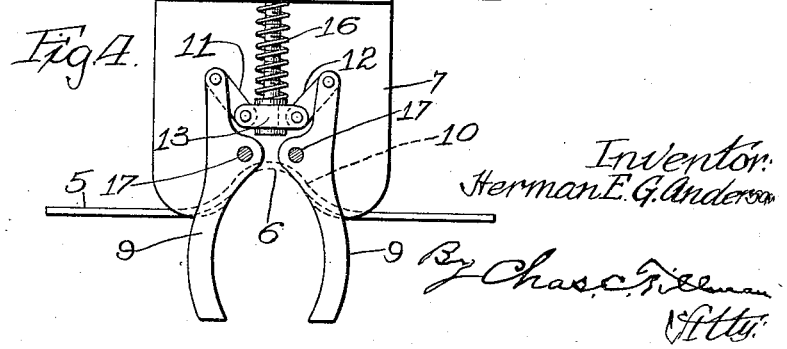
Inventor:
Herman E. G. Anderson
By Chas. C. Tillman
Atty.

Patented Sept. 4, 1923.

1,467,221

UNITED STATES PATENT OFFICE.

HERMAN E. G. ANDERSON, OF INDIANA HARBOR, INDIANA.

COW-TAIL HOLDER.

Application filed May 9, 1923. Serial No. 637,650.

*To all whom it may concern:*

Be it known that I, HERMAN E. G. ANDERSON, a subject of the King of Sweden, residing at Indiana Harbor, in the county of Lake and State of Indiana, have invented certain new and useful Improvements in Cow-Tail Holders, of which the following is a specification.

This invention relates to improvements in means for holding the tails of cows while they are being milked, and it consists in certain peculiarities of the construction, novel arrangement and combination of the various parts thereof as will be hereinafter more fully set forth and specifically claimed.

The principal object of the invention, is to furnish a cow tail holder which shall be simple and inexpensive in construction, strong, durable and efficient in operation, with its parts so made, arranged and co-operating with one another, as well as, with a portion of the animal's body and a part of its tail, in such a manner as to reduce to a minimum or practically eliminate the possibility of any movement whatever of the latter, to the end, that the annoyance usually experienced by milkers, caused by the cows frequently switching their tails in their faces and milk buckets, will be avoided.

Another object is to provide a cow tail holder of the above mentioned general character which shall be of such construction that it can be readily placed in operative position on the animal for effectually holding the tail thereof without the use of straps, chains, cords and the like, heretofore in general use for fastening the tail to the cow's leg or a post, and which can be easily and quickly removed.

A further object is the provision of a cow tail holder, which, by reason of its construction and novel application to the animal's body and tail, will offer little or no annoyance, irritation, or aggravation to the animal when in use, thereby reducing the tendency of the cow to withhold her milk.

Various other objects and advantages of the invention will become apparent from the following description and explanation, which will be more readily understood when read in conjunction with the accompanying drawing, in which, one embodiment of the invention is illustrated, it being understood that various modifications and changes can be resorted to without a departure from the spirit of the invention so long as they fall within the scope of the appended claims forming a part hereof.

In the drawings,—

Fig. 1 is a view in side elevation of the rear portion of the body of a cow showing a tail holder embodying my invention mounted on the back of the cow, with its parts in about the positions they will occupy when holding the tail against movement.

Fig. 2 is a greatly enlarged detached plan view of the device.

Fig. 3 is an enlarged side view of the holder, and

Fig. 4 is a rear end view thereof with the rear portion of the casing for the clamping members and the tail engaging spring omitted.

Like numerals of reference refer to corresponding parts throughout the different views of the drawing.

The reference numeral 5 designates the supporting plate or body of the device, which plate may be made of any suitable size, form and material, but by preferance of metal and of substantially the shape clearly shown in Figs. 2 and 3 of the drawings, that is to say, of an elongated and forwardly widened shape and of relatively thin material. The plate or body 5 is provided along its longitudinal axis with a groove 6 which is preferably produced by bending the plate 5 upwardly on its medial longitudinal line when the plate is made of sheet metal, but when the same is cast, it is obvious that the groove or upwardly curved recess 6 can be formed therein in the usual manner.

At its rear end, the plate 5 is provided with a transversely disposed upward extension 7 which has a horizontally disposed flange 8 at its upper portion as is clearly shown in the different views of the drawing. The extension 7 and its flange 8 comprise a portion of the casing for a pair of clamping members 9 which are pivotally secured to the extension 7 in spaced relation to one another, as is clearly shown in Fig. 4 of the drawing. The lower portion of each of the members 9 is outwardly bowed so as to better adapt them for engagement with the cow's tail near its root, or rather, near its juncture with the back bone of the animal.

As is clearly shown in Fig. 4, the lower end of the extension 7 is provided with an upwardly curved recess 10 which co-incides or registers with the curved portion of the plate 5 which provides the groove 6 on the lower surface thereof. The upper portions of the clamping members 9 are united by toggle joints or members 11, 12 and 13.

Swiveled at its lower end in the member 13 is a screw bolt 14 which is extended vertically through a screw-threaded opening in the flange 8 of the extension 7 and has on its upper end a knob or head 15 by means of which it may be turned in the proper direction for clamping the members 9 on the tail of the animal or for releasing them therefrom. The screw bolt 14 is surrounded by a spring 16 which rests at one of its ends on the member 13 and at its other end against the lower surface of the flange 8, and is employed for assisting the bolt 14 and the toggle members in their actuation of the clamping members, for it is apparent that by turning the bolt 14 in one direction, the toggle members will be raised from the position shown in Fig. 4, thus causing the lower ends of the clamping members 9 to approach each other and thus tightly clamp the cow's tail. The bolt 14 is provided with rapidly acting screw-threads and in reversing its movement, it is apparent that the tension of the spring 16 exerted against the toggle member 13, will assist in releasing the members 9 from their clamped positions.

Secured to the rear surface of the extension 7 by means of screws or rivets 17 is the rear plate or portion 18 of the casing which encloses a portion of the clamping members and the toggle members. This plate 18 has at each of its side edges a flange 19 to rest against the rear surface of the extension 7 so as to hold the plate 18 at a distance from said extension. This plate is also provided in its lower end with a curved recess similar in shape and dimensions to the recess 10 of the extension 7 with which it registers. Secured on the rear surface of the plate 18 just above its recess is the front end of a downwardly deflected and acting spring arm 20 which is cross-sectionally curved so as to embrace the upper portion of the cow's tail on which portion the spring arm 20 will rest when the device is in its operative position. The screws or rivets 17 serve to secure the arm 20 to the plate 18 and also for securing said plate to the extension 7, and furthermore, act as pivots for the clamping members 9 of the device.

For the convenience of handling the holder, a handle 21 uniting the front upper portion of the extension 7 with the supporting plate 5 near its middle, may be employed.

From the foregoing and by reference to the drawing, it will be readily understood and clearly seen that, assuming the clamping members are in their released positions or in about the positions shown in Fig. 4, it is manifest that by placing them around the tail near the root thereof or juncture with the back bone, and by placing the plate 5 longitudinally on the cow's back, the groove 6 in said plate will fit over and extend along a considerable portion of the back bone of the cow while the recess 10 in the lower portion of the extension and plate 18 will fit over the upper portion of the muscular part of the cow's tail, while the clamping members will embrace the sides of said portion of the tail, thus forming substantially a crupper for the tail. When thus positioned, the upwardly concaved spring arm 20 will engage the upper portion and sides of the tail and as the tension of the spring arm 20 is exerted downwardly, said arm will follow any movement of the tail towards the cow's buttocks, and thus prevent its dis-engagement from said arm. By turning the screw bolt 14 in the proper direction, it is manifest that the toggle members can be so actuated thereby as to tightly clamp the members 9 on the tail in which position said members will be held until they are released by turning said bolt in the opposite direction.

By my improvements it is apparent that the cow's tail will be gripped around the muscles thereof with which the tail is switched or swung, and that by reason of the engagement with the back bone of the animal of the supporting plate or body, and by reason of the engagement of the spring arm 20 with the upper portion of the tail, movement thereof to an extent to cause annoyance to the milker or to permit the end of the tail to be switched into the milk bucket, or against the sides of the animal, will be prevented.

By my improvements it is manifest that a highly sanitary device is provided by reason of the fact that the cow, when the device is in operative position on its back, will be prevented swinging her tail to create dust from the floor or from the sides of the animal.

Having thus fully described my invention, what I claim as new and desire to secure by Letters Patent is:—

1. A holder of the class described comprising an elongated supporting plate or body having at one of its ends a transversely and upwardly disposed extension provided in its lower end with a recess, a pair of spaced clamping members each pivoted on said extension, a jointed connection transversely uniting the upper portions of said members, and a screw bolt in loose connection at its lower end with said jointed connection and mounted in screw engagement with the upper portion of said extension for vertical movement, said plate or body having a longitudinally extended groove in its lower surface in register with said recess for the reception of the rear portion of the animal's back bone.

2. A holder of the class described comprising an elongated supporting plate or body having at one of its ends a transversely and upwardly disposed casing provided in its lower end with an upwardly extended recess, a pair of spaced clamping members each pivoted in said casing, a jointed connection transversely uniting the upper portions of said members, a screw bolt in loose connection at its lower end with said jointed connection and mounted in screw engagement with the upper portion of said casing for vertical movement, and a spring arm extended downwardly and rearwardly from the lower portion of the casing, said plate or body having a longitudinally extended groove in its lower surface in register with said recess of said casing.

HERMAN E. G. ANDERSON.